UNITED STATES PATENT OFFICE.

ERNST HOENNICKE, OF DRESDEN, GERMANY.

PROCESS FOR PRODUCING THYROID-GLAND EXTRACTS.

1,036,622. Specification of Letters Patent. Patented Aug. 27, 1912.

No Drawing. Application filed November 27, 1907, Serial No. 404,099. Renewed April 27, 1912. Serial No. 693,559.

*To all whom it may concern:*

Be it known that I, ERNST HOENNICKE, doctor of medicine, a citizen of the German Empire, and residing at Dresden, Saxony, German Empire, have invented a new and useful Process for Producing Thyroid-Gland Extracts, of which the following is a description.

The present invention consists of a process for separating out and producing the colloidal contents of the vesicles contained in macerations of the thyroid gland and of the cell colloids mixed therewith which have passed into a brine solution or a condition of suspension in brine.

Colloidal bodies are capable of assuming two conditions. These bodies do not actually enter into solution like salt or sugar, but what appears as a solution is really suspension in very finely divided particles in the liquid. This condition is known as the "sol" condition. In opposition to this condition is the "gel" condition, *i. e.* a condition of more or less concentrated coagulation or a stringy or gelatin-like condition. All albumin-bodies are colloidal bodies. The more easily such bodies pass into or exist in the "sol" condition and the greater the difficulty in converting them to the "gel" condition, the less marked are the colloidal properties of the same and the contrary is also the case, the more difficult it is to reduce a colloidal substance to the "sol" condition and the more easy it is to bring it to the "gel" condition the more marked are its colloidal properties. The former is the case with the contents of the vesicles or the albumin bodies forming the inner secretions, while the latter is the case with the cell-albumins, *i. e.* the albumin bodies of the cells of the glands.

The object of the present invention is to utilize these different properties of the two bodies to separate the same from each other.

Filters made of clay, porcelain, infusorial earth and the like, such as the Berkefeld, Nortmeyer, Kitasate, Chamberland, Pasteur and other filters are capable of retaining the finest corpuscular elements of the liquid filtered, and are therefore very generally employed for the purpose of filtering liquids to free them of germs.

In filtering the saline macerations of the thyroid glands, it has been observed that, apart from the sediment of the maceration being filtered, a brownish stringy residue remains, which is not a sediment, but will not pass through the filter. This residue was originally considered to be merely one of filtration, but it has now been ascertained that this is not the case. Apparently this residue consists of dissolved cellular substances, which have passed into the liquid of the maceration together with the contents of the vesicles and have been dissolved therein.

A comparative examination of the residue and the fluid filtered, shows that the former consists of cell-albumins which coagulate completely on being heated, while the albumin filtered, will not coagulate even at 100° and will merely opalesce after having been boiled for a considerable time, without, however, leaving any sediment, even after having been allowed to stand for a long period. Therefore although the residue, of course contains slight traces of non-coagulable albumin, the filtrate is entirely free from the coagulable albumin of the residue. This is also proved by the fact that, in filtering liquids of equal initial concentration—and in spite of varying amounts of albumin in the macerations being filtered, due to the extraction of varying amounts of cellular constituents by the saline solution—a filtered liquid having a constant amount of albumin is always obtained. Thus by a purely physical method a result is obtained which, on examination would appear to be as follows:—

The liquid of the maceration contains dissolved cellular constituent parts in addition to the contents of the vesicles, which cannot always be avoided, because many of the thyroid glands are damaged while being removed. These cellular constituent parts, which were originally protoplasms of a gelatinous nature, are for the most part gradually brought into the "sol" state in the brine of the macerating liquid, while the contents of the vesicles, which are of course also colloidal substances, are naturally, for physiological reasons, already in this condition. In filtering as above the two colloidal substances are believed to be separated, the separation being due to the properties of the filtering material. Further experiments have shown that the extreme diffusibility of the contents of the vesicles in comparison with the cellular constituent parts, as assumed, is not only a fact, but a fact of great practical value. The contents of the vesicles and the cellular constituent parts vary so greatly in their quality or capability of diffusion, that by dialysis the crystalloids may not only be separated from the colloids, but the latter may be separated from each other. While, for instance the contents of the vesicles will not pass through a hog's bladder, they will pass through parchment paper, which on the other hand, will not allow cellular albumin to pass. Thus separating diaphragms or partitions of clay, porcelain, infusorial earth or the like are equal to parchment paper. Accordingly the dialysis may take the place of filtration, i. e. if the material of the glands is placed in a properly closed bag of parchment paper or in a porous cylinder of one of the above mentioned materials, in a physiological solution of common salt, the contents of the vesicles alone will pass through the wall and the liquid at the outside will be the finished product. This method of employing the Berkefeld filters and their equivalents, as above mentioned, as an animal membrane, whether for the purpose of filtration or for the dialysis, for separating the dissolved colloids from each other, has hitherto not been employed for the production of thyroid gland preparations, and is novel for this purpose. The following advantages accrue from the employment:—1. There can be no possibility of any chemical influence being exercised on the albumin substances. 2. If the maceration liquid is freed from sediment proper, by previous decanting or filtering, not only will the pure contents of the vesicles be obtained, but also the cellular albumin may be obtained in a pure condition, by repeated washing of the residue of the filtration. It is also not denaturized, for it retains its solubility. As an example:— a. A thyroid gland maceration in salt solution is rendered free of sediment by being repeatedly filtered through the same paper filter and is clearly filtered, whereupon the clear result is filtered through a Berkefeld filter. The filtrate will be the contents of the vesicles and the residue after having been repeatedly washed or dialyzed, will be cellular albumin. In its crude state the maceration contains:—(*a*) some sediment as also small solid particles, (*b*) dissolved cellular albumin in a certain proportion, (*c*) all the vesicle albumin. By repeated filtering through an ordinary filter the sediment mentioned under (*b*) will be eliminated and the solution will be clear. In the filtering or dialysis process in the Berkefeld filter the substances mentioned under (*b*) and (*c*) are separated in a physico-chemical manner i. e. (*b*) passes into the "gel" condition and remains in the filter while (*c*) passes through the filter material.

b. The tissues of the thyroid glands are placed in a parchment bag or tube or in a cylinder of porous clay, or of any of the other materials mentioned and the bag or cylinder hung or placed in a physiological solution of common salt to which 0.5% of phenol has been added. The contents of the vesicles only will pass into the solution.

Experiments with the substance of the other organs have shown that, with the aid of the employment of the materials mentioned as animal membranes, in the form of filters or dialyzing apparatuses, the cellular albumin which has passed into the condition known as that of "sol" or in a state of finely divided particles in suspension, may be entirely separated—owing to its marked colloidal properties—from the diffusible inner secretions.

Further experiments with pure animal membranes, have shown that not all are suitable for the dialysis. Thus hog's bladder is unsuited while the small intestines are well suited for the purpose. Thus, if sausages containing thyroid glands or other organs are made, and suspended in a physiological solution of common salt, the inner secretion will diffuse into the salt solution. Dissolved hemoglobin does not possess the same capability of diffusion as the inner secretions, but almost the same. If the material is previously dried, the preparation will be obtained free from blood and of a pure yellow.

The product of the process is the contents of the vesicle in a liquid state, and by means of the process any injurious alteration of the original condition of the same, which might reduce its effectiveness is entirely prevented. The product is employed in many cases as a remedy and as a material for physiological experiments with animals. The cell-albumins are looked upon as a by-product and may be employed for medical and technical purposes.

I claim as my invention:—

1. A process for separating out and obtaining in a pure liquid state the colloidal vesicle contents or inner secretions of thyroid glands, which consists in passing a maceration of the said organs in brine solution, in which the cellular colloids are in the condition of finely divided particles in suspension, through a filter which allows the vesicle contents only to pass while restraining the colloids of the associated tissues.

2. A process for separating out and obtaining in a pure liquid state the colloidal vesicle contents or inner secretions of thyroid glands, which consists in passing a maceration of the same organs in brine solution, in which the cellular colloids are in the condition of finely divided particles in suspension through a Berkefeld filter which allows the vesicle contents only to pass while restraining the colloids of the associated tissues.

In testimony whereof I affix my signature in the presence of two witnesses.

ERNST HOENNICKE

Witnesses:
 OTTO WOEFF,
 Y. GEORGE DUNNING.